United States Patent [19]

McClintock et al.

[11] Patent Number: 5,427,849

[45] Date of Patent: Jun. 27, 1995

[54] PRESSURE SENSITIVE ADHESIVE TAPE WITH CENTRAL RELEASE LINER AND ITS USE ON A JACKET PORTION OF INSULATION MEMBER

[75] Inventors: Jack M. McClintock, Pittsburgh, Pa.; Gerald H. Knittel, Brecksville; Lana Leggett, Wadsworth, both of Ohio

[73] Assignee: Morgan Adhesive Company, Stow, Ohio

[21] Appl. No.: 216,793

[22] Filed: Mar. 23, 1994

Related U.S. Application Data

[63] Continuation-in-part of Ser. No. 967,226, Oct. 27, 1992, abandoned, which is a continuation-in-part of Ser. No. 749,145, Aug. 23, 1991, abandoned, which is a continuation-in-part of Ser. No. 487,396, Feb. 28, 1990, Pat. No. 5,069,969.

[51] Int. Cl.$^6$ .................. F16L 59/00; B32B 7/12; B32B 5/18
[52] U.S. Cl. ...................... 428/353; 428/40; 428/36.5; 524/560; 138/156; 138/157; 138/128; 138/DIG. 1
[58] Field of Search .......... 428/353, 40, 36, 41, 428/58; 524/556, 560, 561; 138/156, 157, 128, DIG. 1

[56] References Cited

U.S. PATENT DOCUMENTS

| | | | |
|---|---|---|---|
| 3,922,464 | 11/1975 | Silver et al. | 428/500 X |
| 4,147,685 | 4/1979 | Smith, Jr. | 524/560 X |
| 4,157,410 | 6/1979 | McClintock | 428/40 |
| 4,243,453 | 1/1981 | McClintock | 156/152 |
| 4,264,388 | 4/1981 | McClintock | 428/40 X |
| 4,389,270 | 6/1983 | McClintock | 428/40 X |
| 4,584,217 | 4/1986 | McClintock | 428/40 |
| 4,599,265 | 7/1986 | Esmay | 428/354 X |
| 4,629,663 | 12/1986 | Brown et al. | 428/343 |
| 4,645,711 | 2/1987 | Winslow et al. | 428/514 X |
| 4,778,700 | 10/1988 | Pereira | 428/40 |
| 4,857,371 | 8/1989 | McClintock | 428/40 X |
| 4,882,003 | 11/1989 | Bugg et al. | 524/556 X |
| 5,069,969 | 12/1991 | McClintock et al. | 428/40 X |
| 5,154,974 | 10/1992 | Norman et al. | 428/355 |

*Primary Examiner*—Daniel R. Zirker
*Attorney, Agent, or Firm*—Oldham, Oldham & Wilson Co.

[57] ABSTRACT

A sandwich type composite adhesive construction in a simpler form, composed of a central release liner having a permanent adhesive layer on one side thereof and a pressure sensitive adhesive layer on the other side preferably separated therefrom by a release coat or member, and at least one release member on said adhesive layers but in a more complex form containing additional carrier layers or strengthening members including at least one or more support layers between two layers of permanent pressure sensitive adhesive. This adhesive construction provides a product, such as a pipe insulation that has unique properties and is cost effective.

This strip-type composite adhesive construction can be made by applying a barrier layer coat to one or more surfaces of the insulation, either to the surfaces of the slit, or to the peripheral surfaces of the insulation adjacent the slit, or to portions of the adjacent surfaces of the insulation adjacent to the slit, or to the entire exterior surface, depending upon the needs of the user.

8 Claims, 7 Drawing Sheets

PRESSURE SENSITIVE ADHESIVE TAPE WITH CENTRAL RELEASE LINER AND ITS USE ON A JACKET PORTION OF INSULATION MEMBER

This is a continuation-in-part of application Ser. No. 07/967,226 filed on Oct. 27, 1992, abandoned which was a continuation-in-part of Ser. No. 07/749,145 filed on Aug. 23, 1991, abandoned which was a continuation-in-part of Ser. No. 07/487,396 filed Feb. 28, 1990, and now U.S. Pat. No. 5,069,969 issued Dec. 3, 1994.

TECHNICAL FIELD

This invention relates to sandwich type adhesive constructions and particularly to adhesive tapes and their uses. This sandwich construction is useful for insulation that is covered with a jacket of an insulation or without a jacket, viz. a foamed insulation. More particularly, this invention relates to adhesive constructions having a sandwich construction as follows: a center release liner having a pressure sensitive adhesive layer on both sides, one of the adhesives being a permanent pressure sensitive adhesive layer and the other a removable or permanent pressure sensitive adhesive layer, and at least one exterior release liner covering the outside surface of at least one of said adhesive layers.

A special embodiment of this invention relates to a continuous method of making a so-called sandwich type adhesive construction on an insulation member and the apparatus for making continuously the insulation of this invention. A further specific embodiment, is use of this adhesive sandwich construction where the foam insulation is coated with a primer to enhance adhesion of adhesive on the sandwich to the unjacketed insulation.

Specifically, the adhesive construction in a simpler embodiment includes a center release liner having a release coat on one side of said center liner with a pressure sensitive permanent adhesive layer covering said release coat, a removable or permanent pressure sensitive adhesive layer adhered to the other side of said center liner, and an external release layer positioned on the outside of at least one of said adhesive layers with the external release layer adjacent the pressure sensitive permanent adhesive layer being separated from said external release layer by a release coat. Use of primer on foamed insulation eliminates the need for a jacket but gives an enhanced bond between the adhesive sandwich and the foam. Thus, a primed foam on plastic insulation member without a jacket is highly desired for use with this sandwich type adhesive construction.

However, when the use of an ASJ (all service jacket) is found to be desirable, then the application of a protective topcoat or barrier layer on the outside of the ASJ has been found to be effective, improving the tear resistance, extending the non-yellowing time, increasing the water resistance, and decreasing the surface energy of the top layer, thereby lowering dust and dirt pickup. The application of the topcoat or barrier layer additionally may increase the flame retardancy of the product as well as producing a more aesthetically pleasing whiter appearance.

BACKGROUND OF THE INVENTION

Pressure sensitive adhesive constructions which include a center release liner with pressure sensitive adhesive layers on both sides thereof are known in fiberglass insulation industry and used commercially. Such constructions are described in U.S. Pat. Nos. 4,157,410; 4,389,270; and 4,584,217 to McClintock (one of the inventors herein), for example. These patents teach that both pressure sensitive layers are generally the same material.

These commercial adhesives are of relatively complex construction. Consequently, the industry has attempted for years to go to a simpler construction, viz. less layers or coatings in the sandwich. They have been unable to provide a simpler adhesive construction for insulation of pipe that allowed the insulation to be readily packaged and handled without the adherent surface being protected from being soiled, bent or wrinkled during packaging and handling, which creates installation difficulties and increases the cost and labor.

SUMMARY AND DISCLOSURE OF THE INVENTION

In accordance with the present invention, there is provided a foamed or fibrous insulation with a longitudinal slit disposed therethrough, for the purposes of positioning a pipe within and which is subsequently closed through a direct adhesive bond to at least one surface of the slit or onto the outside surface of the insulation, preferably a primed surface. The nature of the product is such that it will permit closure around a pipe to effectively close the slit to prevent heat loss through an air gap and accumulation of moisture therein. We have discovered the primed surface slows the air migration through the primed insulation surface.

This invention according to one aspect provides a simpler adhesive construction resistant to soiling, bending and wrinkling, comprising a center release liner having adhesive layers on both sides of said center liner, at least one of said adhesive layers being a layer of a pressure sensitive permanent adhesive, and the other being a pressure sensitive removable or permanent adhesive with a release coat only on the side of the center release liner adjacent the permanent adhesive side, and an exterior release liner covering at least one of said pressure sensitive adhesive layers.

One of the pressure sensitive adhesive layers is always a layer of a permanent adhesive, while the other adhesive layer is a removable or permanent pressure sensitive adhesive.

One or both of the adhesive layers may be covered with an exterior release liner.

This invention according to another aspect may be a self-wound adhesive tape roll that may be unwound. This roll comprises a simpler adhesive construction comprising a center release liner sandwiched between pressure sensitive adhesive layers on both sides of the center release liner, at least one of the adhesive layers being a layer of a permanent adhesive, the other layer being a removable or permanent pressure sensitive adhesive, and an exterior release liner covering the outermost surface of at least one of the adhesive layers, with a release coat positioned on the permanent adhesive layer between the center liner.

This invention, according to a further aspect, affords a simpler adhesive construction for adhering two surfaces together and is cost effective. This method of adhering the two surfaces together in one embodiment comprises removing the outer release liner from the pressure sensitive permanent adhesive, and pressing or contacting the exposed permanent adhesive to the surface to be adhered. To keep the adhesive construction from becoming dog-eared, the removable or permanent pressure sensitive adhesive may be adhered to the other surface while the adhesive construction is in the storage mode. For instance, where the surfaces to be adhered are the surfaces of a jacket of an insulation for pipes, the pressure sensitive permanent adhesive can be adhered on a surface of the jacket (viz. the Kraft side of an ASJ jacket) that laps over to seal the slit in the insulation and the removable or permanent pressure sensitive adhesive layer is adhered to the exposed surface of the jacket on the other side of the slit to close the insulation in the storage or closed mode. Thus, the pipe jacket product can be easily handled while it is placed in a packing case, shipped to the point of installation, removed from the packing case in a closed mode, free of contamination, and can be easily handed or tossed to a person on scaffolding during the installation phase.

On the other hand, a plastic pipe, viz. fine foam can be given a prime coat of a primer, especially in the adhesive contact areas, to give an improved insulation construction upon adhesion of the closure means to the insulation. The priming can be only in the adhesive area or the entire insulation.

An object of this invention is to provide an insulation capable of effecting closure of the product around the pipe with minimum air gap to reduce heat loss and moisture accumulation.

Another object of this invention is to provide a primed surface to which an adhesive layer will adhere without the typical adhesion problems which have plagued the prior art due to the peculiar contaminants of the foam, porous and fibrous structures.

Yet another object of this invention is to provide a protective topcoat or barrier layer for use with ASJ jackets.

A further object of this invention is to provide an insulation that has some of the benefits of an exterior jacketed insulation to effect the efficiency of the closure of the slit in the insulation.

A further object of this invention is to provide an insulation which has some of the benefits of an exterior jacketed material to effect the closure of the insulation.

One of the novelties of this construction is that it allows easy fabrication, i.e. cutting and fitting of the insulation construction in the closed mode. Thus, the insulation construction allows the insulation to be fabricated, where needed, and to be placed on the pipe by removing the center release liner from the pressure sensitive permanent adhesive and thereby at the same time remove the layer of removable pressure sensitive adhesive to allow the insulation to be placed on the pipe. With the insulation placed around the pipe, the adhesive construction thereon can be pressed down on the area designated 80 in FIG. 8 to adhere the pressure sensitive permanent adhesive thereto to retain the insulation on the pipe or alternatively, the adhesive construction can be placed in slit to give a butt closure, rather than the conventional lap closure.

DETAILED DESCRIPTION OF THE INVENTION

This invention will be described with particular reference to the preferred embodiments and best modes thereof.

Figure 1:
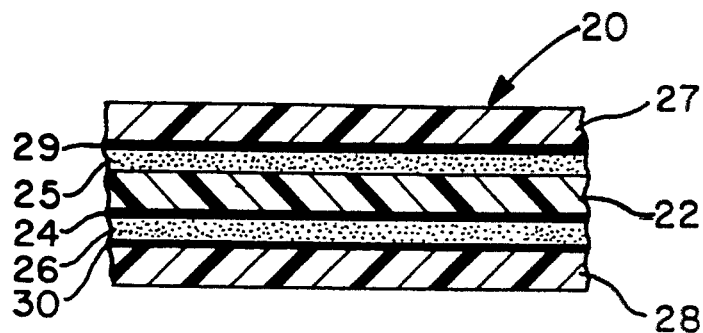
FIG. 1 is an enlarged cross-sectional view of one embodiment of a composite adhesive laminate construction according to this invention.

Referring to FIG. 1, an adhesive sandwich like construction 20 according to this invention comprises a center release liner 22, a silicone release coating 24 on only one side of said center release liner, a permanent adhesive layer 26 contacting the silicone release coating 24. On the other side of said center release liner 22, a removable or permanent pressure sensitive adhesive layer 25 is applied directly to the center release liner 22, and a first and a second exterior release liners 27 and 28 respectively, coated on their respective inner surfaces with silicone release coatings 29 and 30 respectively, covering the permanent and removable and/or permanent pressure sensitive adhesive layers 25 and 26, respectively.

Center release liner 22 may vary in thickness from about 0.5 mil to about 5 or 6 mils (1 mil=0.001 inch). Greater thicknesses are generally impractical because of high cost and lack of flexibility. A desirable thickness in most instances is from about 1 to 4 mils and preferably 3 to 4 mils when utilized in connection with a pipe jacket or without a pipe jacket. Various common materials and/or films well known in the adhesive tape industry may be used for central release liner 22. These include Super Calendar Kraft paper, polyethylene-coated paper, polyethylene film, polyester film, polyvinyl film, polypropylene film, and the like, specifically commercially available ASJ(all service jacket)jackets are an excellent covering for fiber-type insulation.

A release coating 24 may be applied to one side only of the center release liner 22. These release coatings are generally applied in the well known manner, such as a Mayer rod coating or the like and generally are of the customary thicknesses used in the adhesive industry and usually less than 0.1 mil or more in thickness. The release coating is preferably a conventional release material such as the well known commercial silicones recommended for release coats. It is often desirable to dry the release coat at elevated temperatures, say 90°–100° C.

The permanent pressure sensitive adhesive layer 26 is applied to or coated on the silicone-coated side 24 of the center release liner 22. The permanent adhesive layer 26 generally varies in thickness from about 0.5 mil to about 4 mils, with a desirable thickness from about 1 mil to about 2 mils. A preferred thickness is about 1.5 mils. Larger thicknesses can be used but tend to be uneconomical. Common or conventional pressure sensitive type adhesives of the permanent type well known in the art and available commercially from the adhesive manufacturers may be used. These include, for example, acrylic base adhesives, of the pressure sensitive permanent type such as currently used for pipe insulation, rubber based adhesives such as a blend of styrene-butadiene rubber (SBR) and polyisoprene, and at least a suitable conventional tackifier such as hydrogenated rosin ester, polyterpenes, polymerized alkyl styrenes and polymerized petroleum derived monomer resin such as polybutene resin and related resins. Both acrylic based and rubber based adhesives may be formulated to a specific substrate as is well known to the adhesive chemist, containing for example, flame retardant additives, dyes, antioxidants, and other desired additives. The permanent adhesive coating weight for the adhesive layer 26 is that of adhesives normally used in adhesive construction for pipe insulation. Adhesive layers may be applied to central release liner 22 or the release layer or coat 24, by any common or conventional and well known techniques such as calendaring, coating, spraying or the like. Either a water based (i.e. emulsion) or latex adhesive or a solvent based adhesive may be used as well as hot melt.

The permanent adhesive layer 26 is a layer of any permanent type adhesive known in the art, and includes, for example, the well known commercially available acrylics used in the insulation pipe industry, or hot melts.

The term, "permanent adhesive" and "removable pressure sensitive adhesive" are used in their well known, art-recognized meanings. A permanent adhesive is one which forms a strong bond with a substrate to which it is applied, so that neither the adhesive nor any backing (other than a release coated backing such as liner 22 herein coated with release coat 24) to which the adhesive is applied can be removed without damage. A removable pressure sensitive adhesive, on the other hand, is one which can be peeled off, together with the backing to which it is applied, from a substrate surface without damage to either the adhesive or the backing.

Generally, the removable pressure sensitive adhesives are tested for removability on the surface to which they are to be removably adhered. For example, where the adhesive construction is to be used on the pipe insulation having an ASJ jacket, then the removable pressure sensitive adhesive is spread or coated on a portion of the ASJ jacket and then the uncoated portion is bent back at an angle of 180° and pressed down onto the adhesive portion. Then the two portions of ASJ jacket are pulled apart. If the adhesive can be peeled off without damage or residues of the adhesive being left on the uncoated ASJ jacket, the adhesive is classed as a removable pressure sensitive adhesive.

Removable pressure sensitive adhesive such as those latex ones available from Union Carbide or other commercial producers are the type useful herein but they will be tested on the specific substrate being used to decide the one to use.

Representative removable pressure sensitive adhesives are those well known acrylic emulsions described in the following U.S. Pat. 3,922,464 of Spenser Silver et al., 4,645,711 of Richard E. Bennett et al., 4,629,663 of Francis W. Brown et al. and 4,599,265 of Donald L. Esmay. These patents are incorporated herein by reference. The earliest of these removable pressure sensitive acrylic emulsion adhesive patents (Silver et al.) comprises: (a) a copolymer of from 88 to 99 parts by weight of at least one terminally unsaturated vinyl monomer, with 70–100% by weight of said vinyl monomer being a non-tertiary alkyl acrylate, each alkyl group having at least half its carbon atoms in a straight chain and having usually 4 to 12 carbon atoms; (b) from 0.2 to 5 parts by weight of at least one vinyl unsaturated, homopolymerizable emulsifier monomer which is a surfactant having both hydrophobic and hydrophilic moieties and optionally may contain from 0 to 10 parts by weight of at least one Zwitterion monomer.

The Bennett et al. patent is an improvement on the Silver et al. patent and uses tackifier resin in amounts of 5–50% by weight, such as hydrogenated resin ester, polyterpene, polymerized alkyl styrene and polymerized petroleum-derived monomer resins to give the removable pressure sensitive adhesive better resistance to lifting forces at elevated temperatures while also being cleanly removable.

The Brown et al. patent teaches how to make removable pressure sensitive adhesives of the type used as automotive masking tape. The Esmay patent produces removable pressure sensitive adhesive from an alkyl acrylate polymer of low tack but sufficiently tacky to adhere to ordinary substrates by being cross-linked and nearly free of polar substituents. Thus, by adjusting the degree of cross-linking, the pullback or tack value of the adhesive can be made for use desired for the substrate. The usual automobile masking tapes are useful in this invention, particularly where the jacket is primed with a primer as described hereinafter.

The thickness, coating weight, and methods of application of the removable and/or permanent pressure sensitive adhesive layer 25 are similar to those of the permanent adhesive layer 26. Thus, adhesive layer 25 is generally from about 0.5 to about 4 mils, desirably from about 1 to about 2 mils, preferably about 1.5 mils thick.

Figure 2:
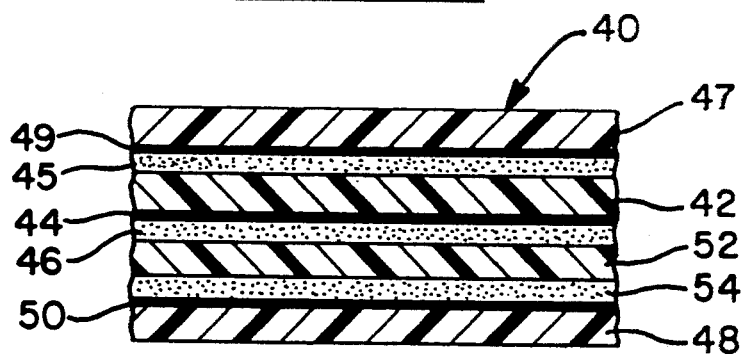
FIG. 2 is an enlarged cross-sectional view of another embodiment of this invention containing multiple support (strengthening)layers(sometimes referred to as a carrier member for the adhesive) for the adhesive and/or release layer or coat to provide a bulking or cushioning effect to the adhesive.

In order to protect the adhesive layers 25 and 26 in the tape construction during storage, transportation and the like, until its application to an item or article, viz. the pipe jacket, two exterior release liners or backing liners may be provided. The first exterior release liner 27 or 47 of FIGS. 1 and 2 is applied to the remaining or exposed surface of the removable pressure sensitive adhesive layer 25 or 45, with a second exterior release liner 28 of FIG. 1 or 48 of FIG. 2, being in contact with the other exposed surface of the permanent pressure sensitive adhesive layer 26 of FIG. 1., or the release coat 50 on the permanent pressure sensitive layer 54 of FIG. 2. The exterior release liners 27 or 47 and 28 or 48 thus protect the respective adhesive layers 25 or 45 and 26 or 46. Exterior release liners may be constructed of the same material as the center release liner 22 (i.e., about 0.5 to about 6 mils thick, desirably 1–4 mils, preferably 3–4 mils). One side of each of the exterior liners (i.e., the inner surface, or the surface which is in contact with the adhesive layer) is coated preferably with a release coating such as 29, 30, 49 and 50. Also, release coatings 24 and 44 may be of the same material. The release coating may be any conventional type of release coating, for example, a silicone coating as set forth with respect to silicone coatings 24, 29 and 30, previously described.

Figure 3:
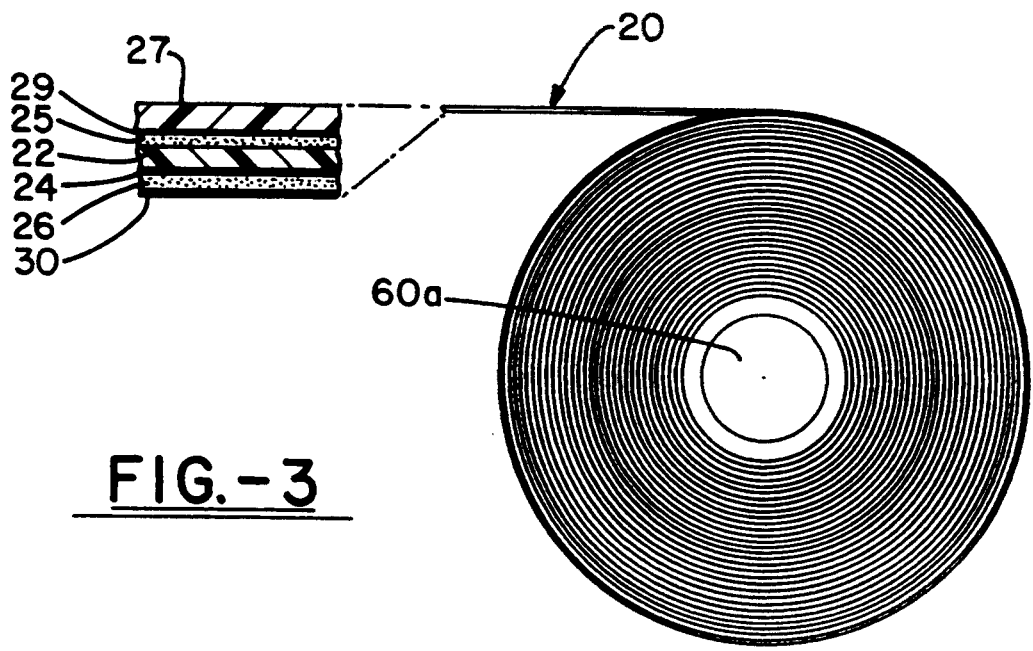
FIG. 3 is a self-wound roll of an adhesive tape according to the embodiments of FIG. 1.
Figure 4:
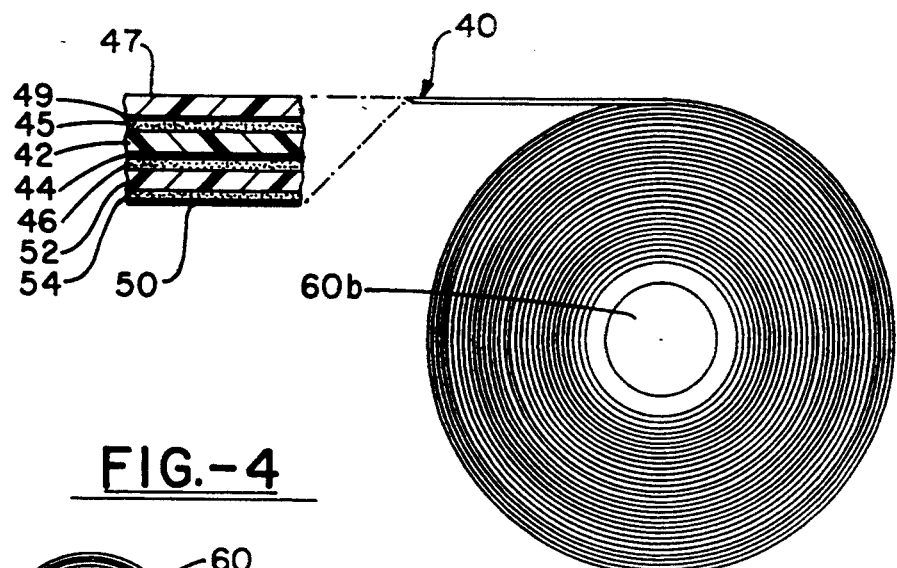
FIG. 4 is a self-wound roll of adhesive tape according to the embodiment of FIG. 2.

In FIGS. 3 and 4, the tapes of FIGS. 1 and 2 respectively, may be wound around a core 60a and 60b. In these embodiments there is no need for the second release liner, i.e. 28 or 48 where the tapes 20 and 40 respectively are wound into a roll.

The adhesive construction of this invention is particularly useful for closing lap seams of the jacket in pipe insulation jackets such as those described in the aforesaid U.S. Pat. No. 4,157,410 or the flexible porous plastic ones. The construction of this invention may be applied in any of the ways described in the aforesaid U.S. Pat. Nos. 4,157,410; 4,389,270; and 4,584,217, all cited supra. These patents are incorporated by reference. In addition, by virtue of the removable pressure sensitive layers 25 or 45, the adhesive constructions 20 and 40 of this invention may be applied in additional ways not previously contemplated as specifically described in regard to FIG. 5 to give novel adhesive construction on the article.

Figure 5:
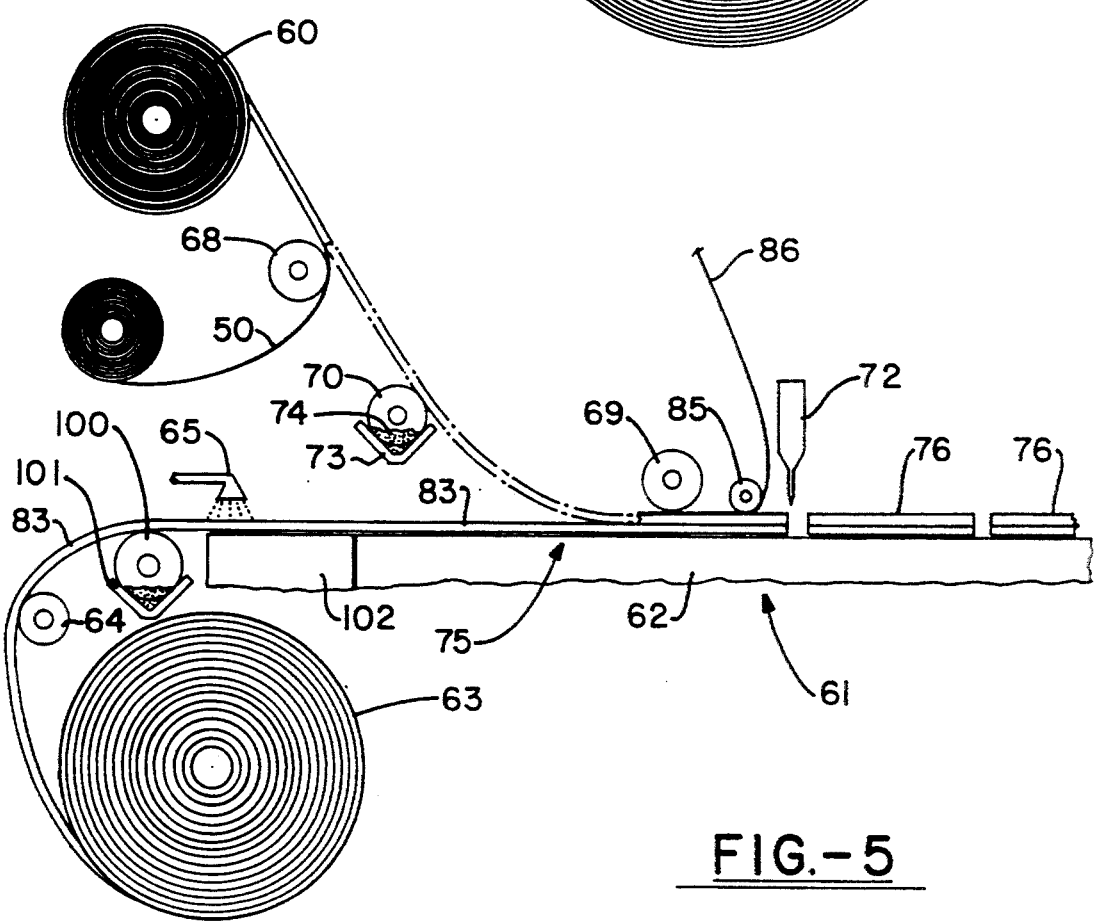
FIG. 5 is a schematic view of an apparatus for applying a roll of adhesive tape of this invention to a jacket for a pipe insulation.

Referring specifically to FIG. 5, the numeral 60 represents a roll of unwindable tape 20 or 40 such as shown by FIGS. 3 and 4, mounted on the tape applying device, indicated generally by numeral 61. The tape applying device 61 comprises an article carder 62 viz. for a pipe insulator jacket 83 spread flat thereon and means to hold the tape unfolded and flat while it is unwound from roll 63 and advances through the device. The pipe insulator may be made of an integral porous plastic or of molded fiberglass having a jacket 83 such as ASJ thereon (known in the industry as a service jacket). In the embodiment of this figure, the jacket 83 is shown as a roll 63 mounted in the device 61. Also, the conventional fiberglass insulation, viz. pipe insulation may be used. The flexible jacket 83 for the pipe insulator is unrolled from roll 63 to pass over roll 64 along support 62 having a heater section 102 and through the station 75 where the tape 20 or 40 is applied to one side of the jacket 83 by the pressure of roll 69 on the support 62. The adhesive tape on roll 60 is unrolled and the exposed release liner 50 is removed by the action of stripper roll 68 to expose the layer of permanent adhesive. Thus, as the tape advances, the layer of permanent adhesive contacts a side of the jacket which may be wet by a primer, or have a dry primer thereon, to aid in effectively adhering the tape to that side of the wrapped jacket. It should be appreciated that priming is not necessary but gives a better result. The pipe jacket, with the permanent adhesive side of the tape adhered to the jacket, passes release layer peeler 85 to pull off the release layer 86 and then advances to the cutter 72. The cutter 72, which is synchronously hydraulically activated, cuts the jacket with the tape thereon into sections of the desired length, usually 36" long, but shorter for butt-strip sections. These sections have the layer of permanent pressure sensitive adhesive, i.e., 25, covered by the release member can have the release member removed to adhere the removable pressure sensitive adhesive layer to the other side of the jacket.

As the composite jacket section 76 moves down the conveyor 62, it is wrapped around a section of pipe insulation (not shown) of fibrous molded siliceous material or a porous plastic material in the normal manner if it is desired to have a jacket. The normal way is to have the molded or formed insulation section covered with the jacket 83 which usually has at least one and preferably two beads 84 of hot melt adhesive spread longitudinally on either the jacket or the insulation to adhere the jacket to insulation when the jacket is rolled around the fiberglass member to cause one longitudinal edge of the jacket to adhere to the insulation near the slit and to provide a jacket to overlap the slit in the insulation section when one edge of the jacket is near the slit.

Figure 6:
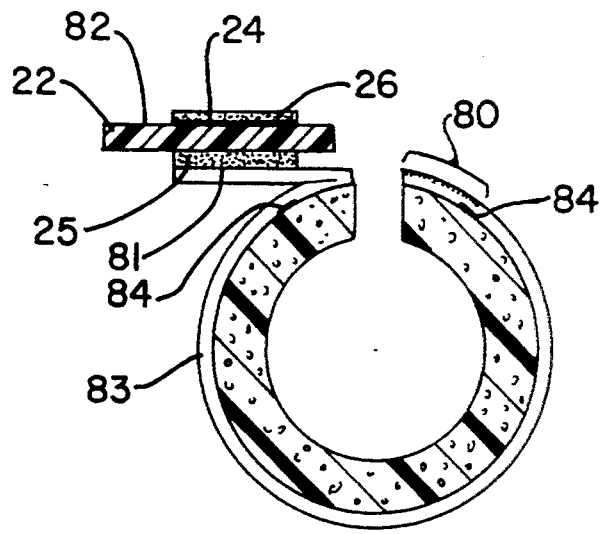
FIG. 6 is an enlarged cross-sectional view of the adhesive construction adhered to the inside surface of the jacket on a section of pipe insulation by the permanent pressure sensitive adhesive layer and folded backward to expose the slit for fitting on a pipe.
Figure 7:
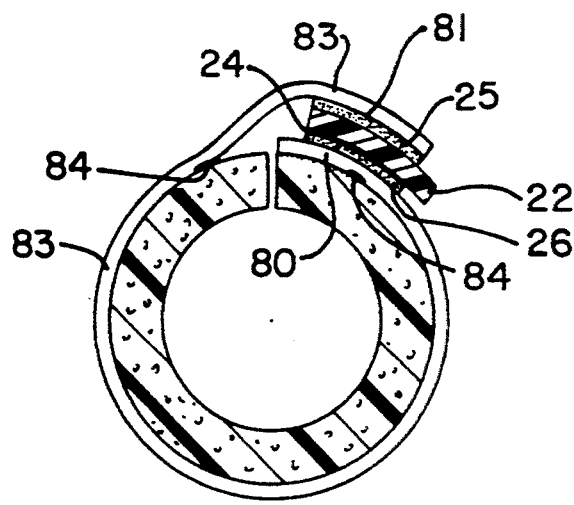
FIG. 7 is an enlarged cross-sectional view of the adhesive construction on a section of pipe insulation that is in the storage mode, viz. the removable pressure sensitive layer is adhered removably to the jacket on the seal side of the slit to hold the insulation closed while in the temporary or storage mode until placed on the pipe to give a lap seal.

In this invention, the jacket section has the adhesive construction adhered to it in the overlap part 81 that will overlap the slit in the area 80 by the permanent pressure sensitive adhesive. With the adhesive construction on the jacket wrapped around the section of insulation as shown in FIG. 6, the overlapped portion 81 can be adhered to the jacket part 80 by the removal pressure sensitive adhesive layer to seal the slit closed while the jacket insulation is in the storage mode as shown in FIG. 7.

Figure 8:
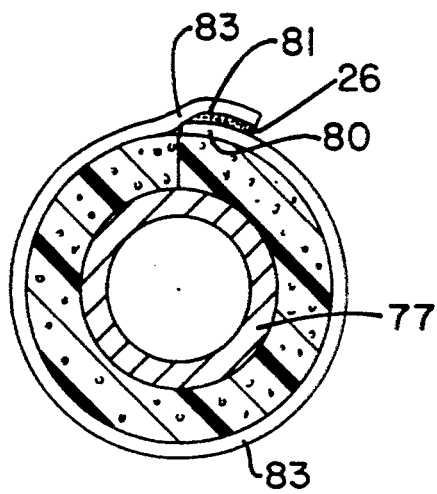
FIG. 8 is a cross-sectional view of the insulation on a pipe with the slit held closed around the pipe by sealing the overlapping jacket with the permanent pressure sensitive adhesive to the jacket on the other side of the slit.

The jacket insulation remains closed during the so-called packing, storage and shipping modes, i.e., until it is desired to place it on a pipe as shown in FIG. 8. When the center release liner is pulled loose and this action normally will remove the removable pressure sensitive layer also and allow the slit to gape open, similar to that shown in FIG. 6. With the slit open, the composite section insulation is placed over and around the pipe 77 as shown in FIG. 8. Then the pressure sensitive permanent adhesive layer is closed as shown in FIG. 8. with the pressure sensitive permanent adhesive layer adhered over area 80.

A primer may be applied to wet the surface of the permanent adhesive layer by the adhesive primer roll 70 mounted rotatively in a box 73 containing primer 74, or other suitable means such as spraying as by spray head 65 may be used to apply the primer. Alternatively, the primer may be coated on the jacket 83 as it passes over roll 100 and dried as it passes heater 102. When the composition is applied to the surface of the jacket, it is usually referred to as a protective topcoat or barrier layer. The primers that may be used are well known in the coating industry.

Use of primer on foam insulation gives unexpected improved results as a jacket is not normally used. The foam insulation can be open-celled, closed-cell and microporous preferable with a relatively thick integral skin. The primers containing precipitated or fumed silica serve to reduce or fill the pores of the foam. The porous foam insulation that has been primed gives a better bond with the adhesives, especially when the primer contains from 10 to 65% polymeric rubbers or resinous material. Although essentially all solvents are useful, caution must be taken where the solvent tends to destroy the insulation material. For instance, aromatic solvents would dissolve a styrene foam insulation, mot melt, so an alcoholic liquid or water emulsion may be used to avoid collapsing the foam.

Although any of the primers may be used with some foams, the ones most desired use hydrocarbon or chlorohydrocarbon solvents such as toluene or chlorohexane and contain about 1% to 30% and preferably 5% to 20% by weight of a finely divided powdery silica, usually referred to as precipitated or fumed silica and available under the trade name of Cab-O-Sil. It is most desirable that the primer contain a polymeric material to give the primer body and to aid in maintaining the finely divided silica in suspension. A very desirable primer is a toluene suspension of about 5% to 30% finely divided powdery silica, and about 10% to 60% of a polymer on a weight basis. Preferably acrylic or methacrylic ester polymers are used. Well-known solvents other than toluene may be used. The acrylic esters may be the esters of the lower alcohols such as ethyl, propyl, butyl, 2-ethylhexyl with the acids of acrylic and methacrylic to give methyl acrylate, methyl methacrylate, ethyl acrylate, ethyl methacrylate, butyl acrylate, butyl methacrylate, 2-ethylhexyl acrylate, and 2-ethylhexyl methacrylate alone or mixtures thereof or with polyvinyl acetate. A very preferred primer is a mixture of about 8% to 15% precipitated silica, about 18% to 28% of the acrylic esters known as Acryloid-72 and 57% to 74% toluene.

The primer may be applied to the jacket in the areas 80 and 81 and dried prior to wrapping the jacket to the molded fiberglass pipe 83. Also, the acrylic type primers are preferred with the acrylic permanent adhesive. Although the elastomeric type primer may be used, they particularly are useful with the elastomeric adhesives.

Thus by use of an adhesive construction having a support liner with a permanent adhesive layer on one side thereof and pressure sensitive removal adhesive with a release member properly positioned therebetween, it is possible to provide a pipe insulation having an adhesive construction that is unique.

Figure 9:
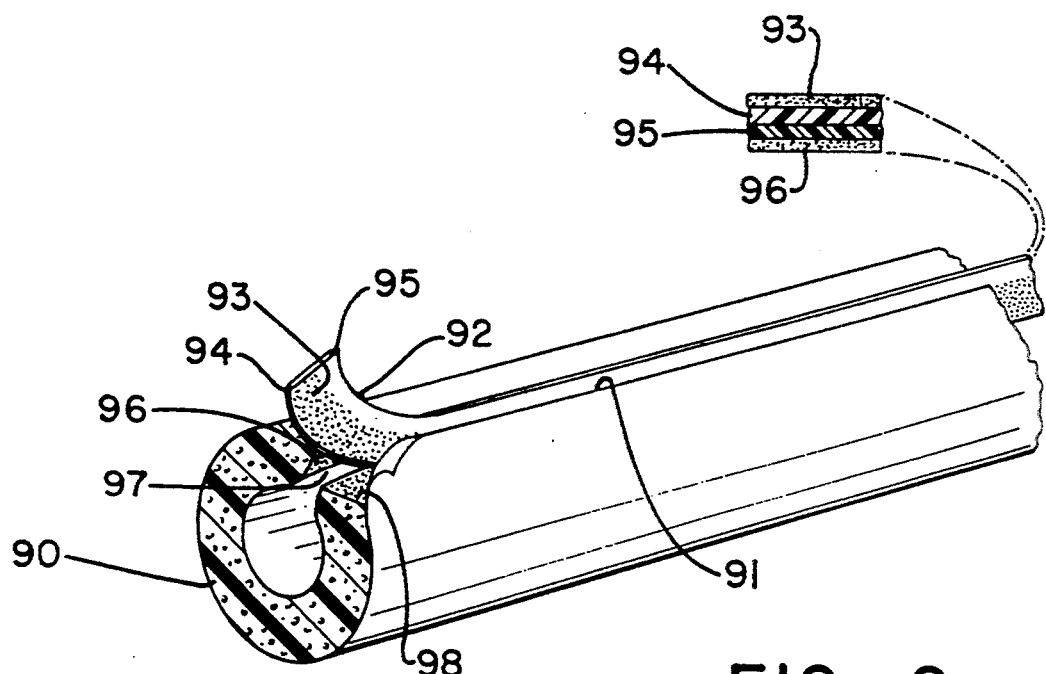
FIG. 9 is a perspective view of a specific embodiment of this invention as used with a section of pipe insulation to seal the slit therein.

Another use of the adhesive construction of this invention is illustrated in FIG. 9 where 90 is the section of pipe insulation and 91 is the slit. A preferred form of the adhesive construction 92 is shown positioned in the slit 91. This adhesive construction comprises a layer of removable pressure sensitive adhesive 93 on a Kraft paper sheet or center liner 94 having a release coat 95 on the center liner opposite the side of liner 94 removable pressure sensitive layer or coat on said center liner. As the center liner 94 is pulled from the slit, it takes the removable pressure sensitive adhesive layer 93 and release coat 95. The permanent pressure sensitive layer or coat 96 on release coat 95 is stripped away to leave a layer or coat 96 of permanent pressure sensitive adhesive adhered to the face 97. With the center liner stripped from the section of pipe insulation, it can be closed around a piece of pipe. Then, the section of slit face 97 can be brought into contact with slit face 98 whereby the layer or coating 96 of permanent pressure sensitive adhesive transferred from the center liner adheres the two faces of the slit together.

It is desirable in some cases to prime at least one face of the slit with a primer such as described herein. The primed face enhances the bonding of the adhesive to the face. The construction of FIG. 9 allows the pipe insulation to be stored, shipped and handled in the closed mode, as the removable pressure sensitive adhesive adheres to face 98 but is stripped from face 98 upon removal of the center liner 94.

Figure 10:
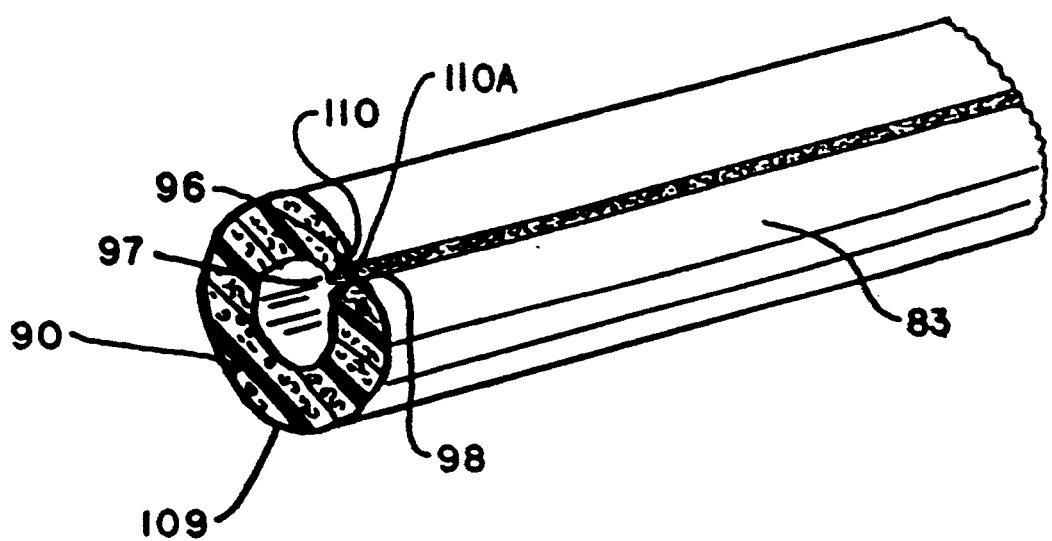
FIG. 10 is a perspective view of another specific embodiment of this invention as used with a section of pipe insulation to seal the slit thereof having the ends of the jacket adhered to the sides or faces of the slit to give a butt seal.

Referring to FIG. 10, the fiberglass insulation section 90 is shown wrapped in a jacket 109 such as the well known ASJ jacket with each end 110 of the jacket tucked inside the slit 98 to the slit faces 111. The tucked in ends 100 of the jacket are preferably adhered to the faces 111 of the slit with an adhesive such as the well known hot melt adhesive to adhere to this insulation having the ends of the jacket tucked into the slit. The adhesive construction of FIG. 9 can be placed in the slit and be adhered to the ends of the jacket to give the product of FIG. 10. Thus, the adhesive construction of this invention where the center liner has the release coat on one of its sides covered with a layer of a permanent pressure sensitive adhesive and the other side has layers of removable pressure sensitive adhesive. Thus, the adhesive construction in the slit of FIG. 10 has the permanent pressure sensitive adhesive adhered to the tucked or folded in end 110A of the jacket adhered to the slit surface and the removable pressure sensitive adhesive layer is adhered to the tucked in adhered end 110B of the jacket. Thus, when it is time to place it on a piece of pipe, the center liner and removable pressure sensitive layer are removed to open the slit and the open slit is placed over the pipe and pressed together to close the faces of the slit by means of the permanent pressure sensitive adhesive to retain the insulation section on the pipe.

Figure 11:
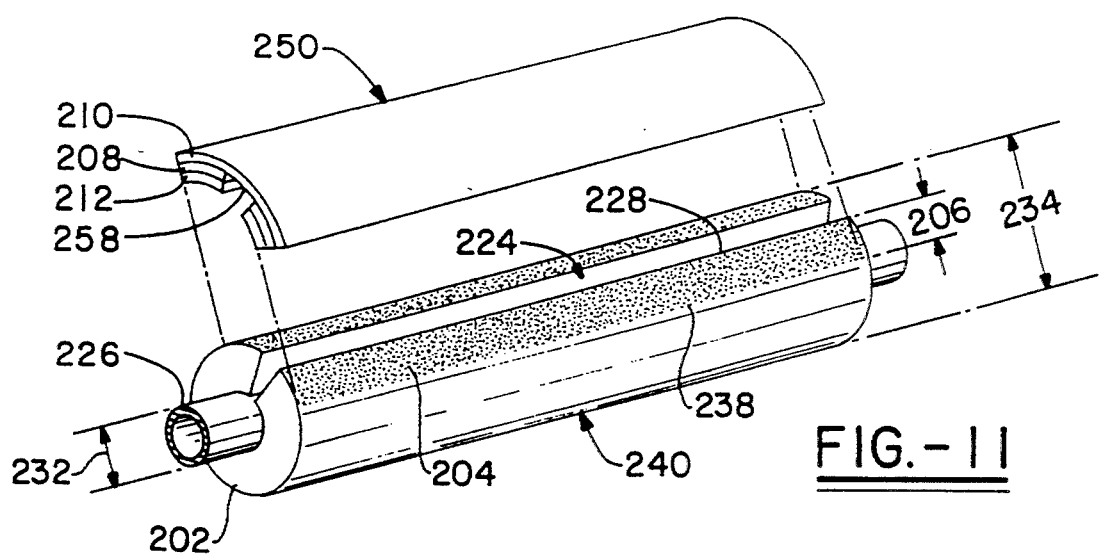
FIG. 11 is an expanded perspective view of a sleeve of insulation with a longitudinal slit disposed along the length of the sleeve, with sandwich to be adhered thereto.
Figure 12:
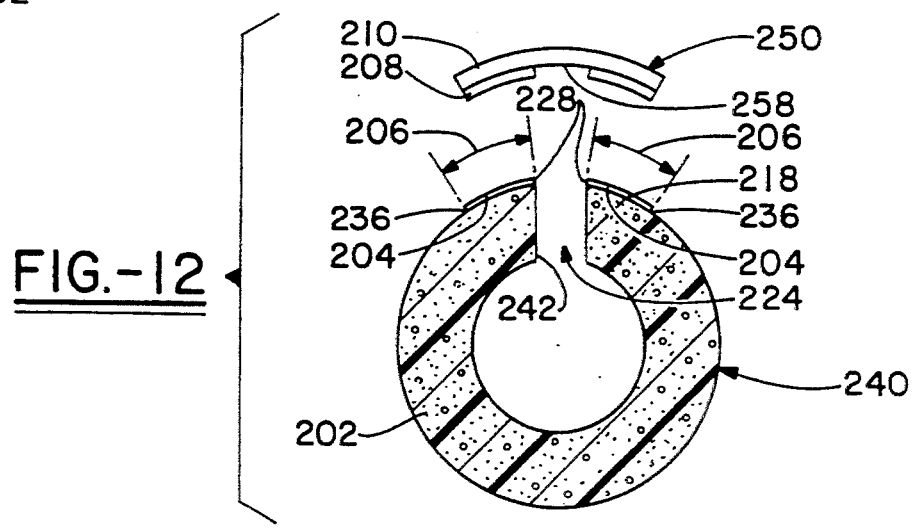
FIG. 12 is an expanded cross-sectional view of a premade adhesive sandwich attached to a primer coated surface.
Figure 13:
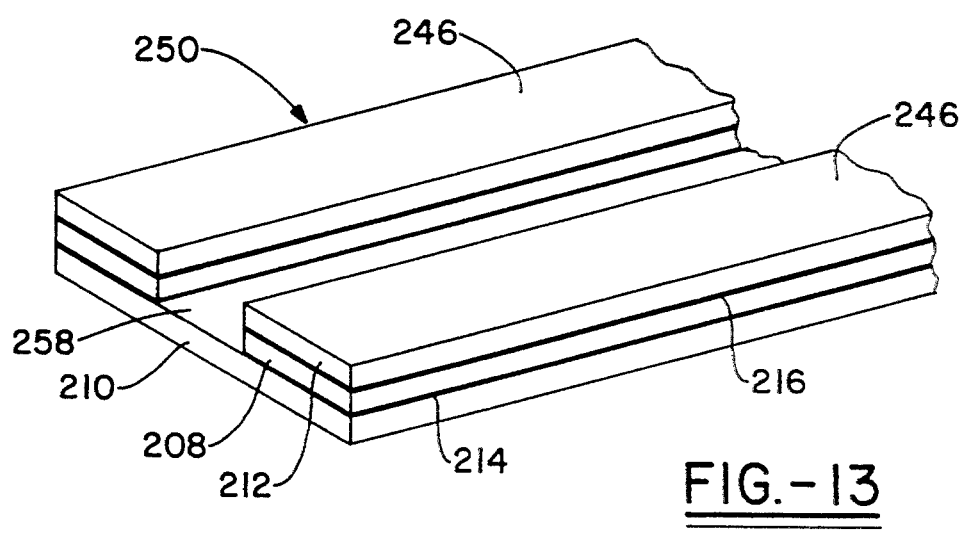
FIG. 13 is a partial perspective view of the premade adhesive sandwich.

Referring now the FIGS. 11–13 of the drawings wherein the showings are for purposes of illustrating an embodiment of the invention only and not for purposes of limiting the same, the figures show generally an insulation sleeve containing a longitudinal slit, which is applied to the exterior surface of a pipe through the application of an adhesive strip, preferably premade.

Foamed organic polymers and organic foam composite materials are well known and are used in the insulation, construction and similar industries. These foams, generally, are of relatively high density, and are generally characterized by densities greater than 100 mg/cc. Such foams can be either flexible or rigid. Flexible foams may be polyurethane, rubber latex, polyethylene, polypropylene or vinyl polymers, for example, while rigid foams are chiefly polystyrene, epoxy, and polyvinyl chloride. The blowing agents used are varied, of which several representative examples would be sodium bicarbonate, halocarbons, such as $CCl_3F$, and hydrazides.

A natural ramification of the synthetic procedures used in the preparation of such foamed materials, is that the foaming agents used may tend to accumulate at an exterior surface of the product. The presence of these foaming agents makes it difficult to achieve a good adhesive bond, particularly when pressure-sensitive adhesives are used.

As seen in FIG. 11, the insulation product described, is essentially a two-component system of an essentially elongated cylindrical foamed polymeric insulation 240 which encases pipe 226 and is enclosed by the application of adhesive strip 250. Such pipes may be formed of copper, steel, aluminum, thermoplastic, rubber or other like materials and have an exterior diameter 232. Pipe 226 is inserted into insulation 240 preferably by placing it into the hollow cylinder by insertion through longitudinal slit 224, the method of attachment being somewhat dependent upon the degree of flexibility of insulation 240.

Foamed polymeric insulation 240 contains any number of various polymeric materials, and by well-known processes. During the synthetic processing, the foaming agents may tend to accumulate at the exterior peripheral surface of insulation 240. The natural properties of these materials are such that a good adhesive bond, particularly a pressure-sensitive bond is difficult to achieve.

As shown in FIGS. 11 and 12, in order to achieve a more effective adhesive bond, insulation 240 is provided with an attachment zone 206 upon which a primer 204 has been applied. This attachment zone 206 extends from a peripheral edge 228 of the longitudinal slit 224 along the circumference of the insulation 240 to a terminal line 238. Attachment zone 206 extends along both sides of the longitudinal slit 224. In another embodiment the primer is applied to the slit surfaces, especially when the jacket is tucked into and adhered to the slit surface.

The primer 204 applied to the exterior surface 218 of insulation 240 is any one of a number of primers known-in-the-art. Typical of the list of primers are hydrocarbons or chlorohydrocarbon solvents such as toluene or chlorohydrocarbon solvents such as toluene or chlorohexane and contain about 1% to 30% and preferably 5% to 20% by weight of a finely divided powdery silica, usually referred to as precipitated or fumed silica and available under the trade name of Cab-O-Sil. It is most desirable that the primer contain a polymeric material to give the primer body and to aid in maintaining the finely divided silica in suspension. A very desirable primer is toluene suspension of about 5% to 30% finely divided powdery silica, and about 10% to 60% of a polymer on a weight basis. Preferably acrylic or methacrylic ester polymers are used. Well-known solvents other than toluene may be used. The acrylic esters may be the esters of the lower alcohols such as ethyl, propyl, butyl, 2-ethylhexyl with the acids of acrylic and methacrylic to give methyl (meth)acrylate, ethyl (meth)acrylate, propyl (meth)acrylate, butyl (meth)acrylate, and 2-ethylhexyl meth(acrylate) either along or mixtures thereof or with polyvinyl acetate. A very preferred primer is a mixture of about 8% to 15% precipitated silica, about 18% to 28% of the acrylic esters known as Acryloid-72 and 57% to 74% toluene.

The primer may be applied to the exterior surface 218 of insulation 240 in the areas of the attachment zones 206 and dried. Also the acrylic type primers are preferred with the acrylic permanent adhesive. The elastomeric adhesives are useful, too.

Insulation 240 is effectively closed by the application of adhesive strip 250. As shown in FIG. 13, adhesive strip 250 is a multilayered product containing a base layer 210 upon which pressure sensitive adhesive 208 is applied at interface 214. Ordinarily, to prevent premature adhesive-contact of adhesive 208, release liner 212 is applied which includes a release coating 216 at the interface. Adhesive 208 with release liner 212 are generally configured as two longitudinally-extending strips 246, in a generally parallel orientation to each other, thereby sandwich a non-adhesive region 228 between.

Both acrylic based and rubber based adhesives may be formulated to a specific substrate as is well-know to the adhesive chemist, containing for example, flame retardant additives, dyes, antioxidants, and other desired additives. The permanent adhesive coating weight for the adhesive coating weight for the adhesive layer 208 is that of adhesives normally used in adhesive construction for pipe insulation. Adhesives layer may be applied to release liner 212 by any well-known techniques such as calendaring, coating, spraying or the like. Either a water-based (i.e. emulsion) or latex adhesive or a solvent-based adhesive may be used.

The completed insulation product is formed by the combination of insulation 240 coming in adhesive contact with adhesive strip 250. Prior to the application of adhesive strip 250 to insulation 240, release liner 212 is removed from the adhesive strip, thereby exposing adhesive 208. Adhesive strip 240 is manually positioned such that non-adhesive region 228 is adjacent to longitudinal slit 224 and adhesive 208 is adjacent to attachment zone 206. Through the interaction of adhesive 208 with primer 204, a secure bond is formed therebetween effectively fastening the insulation to pipe 226.

Figure 14:
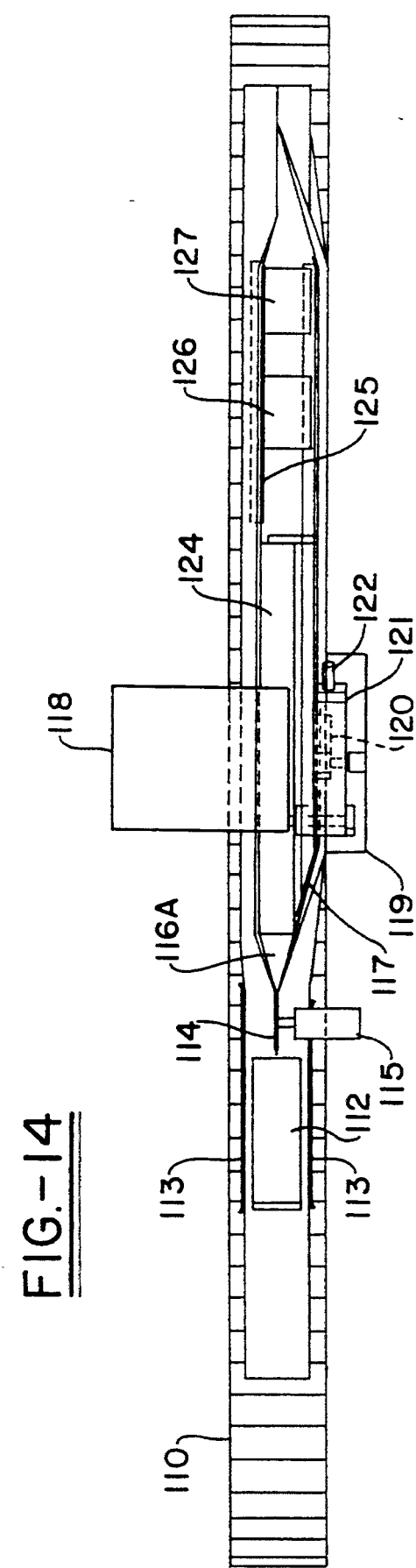
FIG. 14 is a plan view of a modified apparatus of FIG. 5.

Referring to the plan view of the apparatus of FIG. 14, numeral 110 designates a conveyor and numerals 112 and 113 respectively designates a section of tubular foam insulation passing through a hold down means and an alignment guide. The aligned insulation held in a fixed position moves forward with the conveyor to contact a saw-like cutter or slitter 114, powered by motor 115 to slit the insulation. The forward-moving slit insulation passes beneath adjuster roll or bar 116 to depress the edges of the slit and by adjusting the position of the tape applicator 118, the tape can be applied to the exposed surface of either the slit surface or the peripheral surface depending on the position of the tape applicator roll. The tape applicator roll usually is positioned by turning the adjuster screw, to cause the tape to contact the slit surface to apply to inside of the slit. On the other hand, positioning the tape applicator roll to contact the peripheral surface, i.e., the outside surface of the insulation essentially adjacent the edge of the slit, applies the adhesive construction to the peripheral surface.

Figure 15:
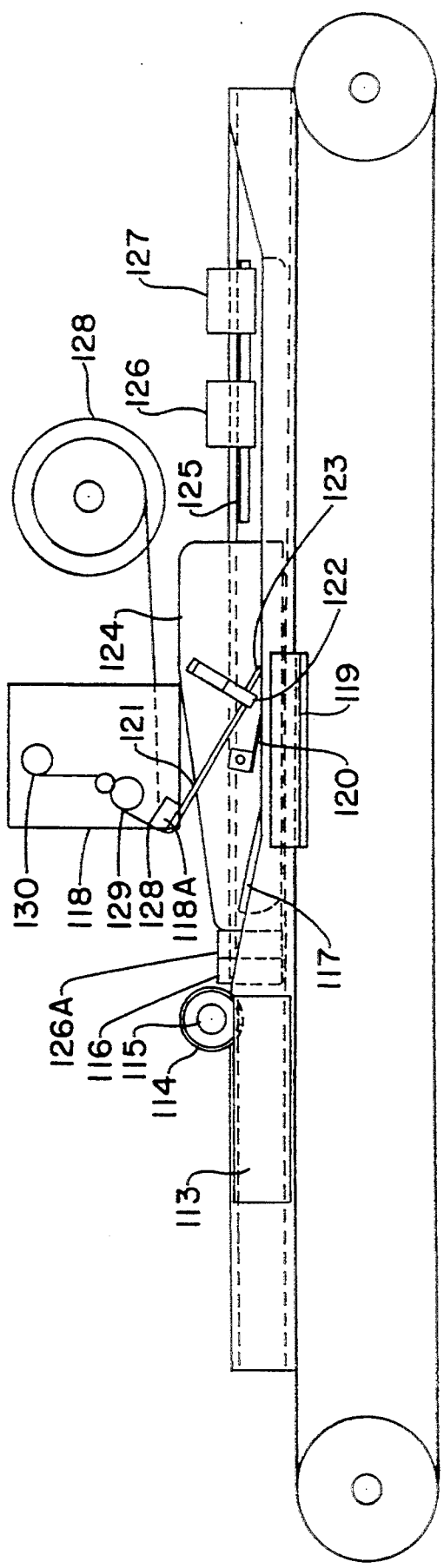
FIG. 15 is a vertical view of FIG. 14 to show the apparatus for a continuous process for making sections, usually about 32 inches long, of an adhesive sandwich adhered to or around the slit to give an adhesive sandwich adhered on the insulation in the storage and shipping mode or alternatively, the sections can be cut for butt-strip use.

Referring to FIG. 15, the details of the tape applicator is shown with the tape supply 118 mounted to supply tape to roll 118A which feeds to tape cutter 112 with the release member 121 being stripped or peeled by peeler 111 from the tape prior to the tape being cut and the stripped liner is returned by capstan drive 129 to liner take-up 130.

When a primer is used, it may be applied to the adhesive surface as shown in the drawings by numeral 126 which may be a mayer rod, a wiper or other conventional means of applying a paint to a surface. Also, if desired the insulation with the adhesive sandwich adhered thereto may receive a stabilizing treatment in treatment station 125 before passing through primer station 126. With some primers it is beneficial to subject the primer-treated product to ultraviolet or heat treatment by passing it through treating station 127.

In an alternate primer treatment, the primer may be applied in station 126A and then receive a primer coat between the permanent adhesive and the exposed surface of the insulation.

The apparatus of FIG. 14 may be modified to provide at a suitable position on the conveyor line after application of the adhesive strip from roll 128. For instance, after the treater 127 there is a means to form butt strips. This means comprises a roll of the sandwich adhesive construction mounted above the conveyor with a means that moves the construction across the jacket traversely to place the permanent adhesive layer into adhesive contact with the jacket to deposit the sandwich adhesive composition on the jacket from side to side perpendicular to the line of travel of the jacket. Then a longitudinal moving saw or scissor means cuts the deposited sandwich along a longitudinal edge adjacent the side of the jacket and a second saw or scissors means cuts the deposited sandwich adhesive composition in half from side to side of the jacket. The movement of the conveyor to its next pause or stop station relative to actions of the saw or scissors means determines the length of the butt strip. Preferably, this is accomplished by having the conveyor be a second one that operates independently and intermittently by use of an electric timer that controls the electricity fed to the conveyor motor. The timing is controlled to move the continuous jacket material with the adhesive sandwich from FIGS. 14 and 15 thereon forward a distance equivalent to the width of the butt strip. While the second conveyor is stopped, the means to deposit the sandwich adhesive on the jacket is activated and moves to deposit or lay the adhesive sandwich construction across the jacket from side to side. This is followed by activation of the longitudinal saw or scissor means by supplying current to the motor to cut the tape from the sandwich adhesive construction roll adjacent the longitudinal edge of the jacket material. The traverse saw or scissor means is activated by supplying electricity to its motor to divide the traverse sandwich adhesive construction preferably into two equal parts and simultaneously cut the jacket into a length appropriate for a butt strip. These series of operations are repeated to obtain the desired number of butt strips. This mode of making butt strips reduces the hand labor and allows them to be made continuous with Feat precision and relatively economically.

EXAMPLES

The invention will be better understood by reference to the following illustrative and non-limiting representative examples which show the preparation of various topcoats and primers which would be useful in the instant invention.

Topcoat Formulations:

The use of protective topcoat layers for ASJ jackets has been found to unexpectedly overcome the following drawbacks which are normally associated with these types of Kraft type paper layers which are normally saturated with $SbO_5$ and $TiO_2$: (1) tear and puncture problems; (2) yellowing with time; (3) poor resistance to water and high humidity; and (4) surface finish easily attracts dust and dirt.

When topcoat layers are applied to the exterior surface, at a thickness ranging from 0.01 to 1.0 mils, whether in a complete surface application or to selected areas on the exterior surface, the following desirable characteristics are achieved: (1) increased tear and puncture resistance; (2) extension in non-yellowing time; (3) increase in water resistance; (4) decrease in surface energy, minimizing dirt and dust pickup; (5) improvement in fire retardancy; and (6) a whiter appearance.

EXAMPLE #1

The following quantifies of materials should be mixed individually, for ease of experimentation, and combined to produce topcoats suitable for use on the surface of ASJ jackets.

| Component | 1A | 1B | 1C | 1D |
|---|---|---|---|---|
| Toluene | 52 | 52 | 52 | 52 |
| Isopropyl acetate | 17 | 17 | 17 | 17 |
| ACRYLOID ® A-21LV (30%)[a] (2-propenoic acid, 2-methyl-, methyl ester, homopolymer) | 35 | 35 | 35 | 35 |
| Rutile (natural) $TiO_2$ | 100 | 100 | 100 | 100 |

[a]Rohm & Haas

| Component | 1A | 1B | 1C | 1D |
|---|---|---|---|---|
| ACRYLOID ® A-21LV (30%)[a] (2-propenoic acid, 2-methyl-, methyl ester, homopolymer) | 530 | 530 | 530 | 530 |
| Butylbenzyl phthalate | 72 | 72 | 72 | 72 |
| Isopropyl acetate | 13 | 13 | 13 | 13 |
| Methylethyl ketone | 21 | 21 | 21 | 21 |
| Toluene | 21 | 21 | 21 | 21 |
| CYASORB ® ([2,2'-thio-bis(4-t-octylphenolato)]n-butyl-amine nickel (II)) 1084[b] | 0 | 1 | 2 | 3 |

[a]Rohm & Haas
[b]Cytec Industries, formerly American Cyanamid

EXAMPLE #2

| Component | 2A | 2B |
|---|---|---|
| Toluene | 200 | 200 |
| EVA (EY-902-25)[a] | 10 | 10 |
| Chlorinated polyolefin | 15 | 15 |
| $TiO_2$ | 5 | 5 |
| TINUVIN ® P[b] (2-(2'-hydroxy-5'-methyl-phenyl)benzotriazole) | 2 | 4 |
| NEOCRYL ® A 5045[c] (Arsanilic acid, N-(N-methyl-succinamoyl)-, monosodium salt) | 200 | 200 |

[a]Quantum Chemical
[b]Ciba-Geigy
[c]ICI

EXAMPLE #3

| Component | 3A | 3B | 3C |
|---|---|---|---|
| Methylethyl ketone | 300 | 300 | 300 |
| Polyethylene terephtliate 46960[a] | 10 | 10 | 10 |
| MICROTHENE ® polyolefin[b] (polyethylene resin) | 17 | 30 | 17 |
| Synthetic wax B2[c] | 5 | 5 | 10 |
| $TiO_2$ | 10 | 10 | 10 |
| ACRYLOID ® B117[d] (acrylic acid ethyl ester, polymer with methyl methacrylate) | 20 | 7 | 13 |
| IRGASTAB ® 2002[e] (Phosphonic acid [[3,5-bis(1,1-dimethylethyl)-4-hydroxy-phenyl]methyl]-, monoethylester, nickel (2+) salt (2:1)) | 3 | 43 | 3 |

[a]Dupont
[b]Quantum Chemical
[c]Ross Co.
[d]Rohm & Haas
[e]Geigy Ind. Chemicals

EXAMPLE #4

| Component | 4A | 4B | 4C | 4D |
|---|---|---|---|---|
| Toluene | 300 | 300 | 300 | 300 |
| FLEXANE ® 417B[a] (polyurethane) | 25 | 25 | 35 | 35 |
| ACRYLOID ® B117[b] (acrylic acid ethyl ester, polymer with methyl methacrylate) | 10 | 5 | 10 | 5 |
| $TiO_2$ | 5 | 5 | 5 | 5 |
| Chlorinated polyolefin[c] | 13 | 13 | 8 | 8 |
| CYASORB ® UV-9[d] (2-hydroxy-4-methoxybenzophenone) | 3 | 3 | 3 | 3 |

[a]Devcon
[b]Rohm & Haas
[c]Quantum Chemical
[d]Cytec Industries, formerly American Cyanamid

EXAMPLE #5

| Component | 5A | 5B | 5C |
|---|---|---|---|
| Toluene | 300 | 300 | 300 |
| ACRYLOID ® B72[a] (acrylic acid ethyl ester, polymer with methyl methacrylate) | 75 | 50 | 20 |
| Chlorinated PO[b] | | 50 | 85 |
| SYLOID ® 74[c] (silica gel) | 15 | | 15 |
| $TiO_2$ | 5 | 5 | 5 |
| Aluminum trihydrate[d] | 3 | | 3 |
| MISTROL ® (vapor talc)[e] (talc $(Mg_3H_2(SiO_3)_4)$) | | 10 | |

[a]Rohm & Haas
[b]Eastman Chemical
[c]W.R. Grace
[d]Huber
[e]Dar-Tech

Barrier Layer Formulations:

Since the government has restricted the use of CFC (chlorofluorocarbons), many polyolefin foam producers have switched to hydrochlorofluorocarbon (HCFC) as the blowing agent. HCFC is not harmful to the earth's ozone layer. However, HCFC allows additives, such as stearic acid, surfactants, nucleating agents, etc., to migrate with ease to the surface of the foam. These additives act as lubricants and prevent pressure sensitive adhesives from adhering to the foam.

To overcome the above problems with the use of HCFC's, a barrier layer is described which absorbs any and all of the surface contaminates, e.g., stearic acid, surfactants, etc., and is anchored permanently to the polyolefin foam. This now provides a site for pressure sensitive adhesive bonding and prevents any further migration of the previously enumerated additives in interfering with the performance of the pressure sensitive adhesive. The shift from CFCs to HCFCs required an approximately 20-fold increase in stearic acid concentration, which typically resides on the surface of the foamed material, with detrimental consequences on adhesive characteristics.

The following compositions when brushed, rolled or sprayed onto polyolefin foam to a thickness of 0.4 to 6 mils (dry) would be effective in preventing blowing agents and lubricants from detrimentally affecting the interface with the pressure-sensitive adhesive. The films would be dried in the oven until all solvent was removed. The width of the barrier coating is determined by the width of the adhesive which is being applied to the foam, although larger and smaller applications of the primer are envisioned within this invention.

EXAMPLE #6

| Component | 6A | 6B | 6C | 6D |
|---|---|---|---|---|
| Toluene | 200 | 200 | 200 | 200 |
| KRATON ® 1107[a] (styrene-isoprene-styrene block copolymer) | 100 | 50 | 50 | |
| PENTALYN ® H[b] (rosin, hydrogenated, ester with pentaerythritol) | 37 | | | 37 |
| PICCO ® N-100[c] (alkylated aromatic hydrocarbon) | 38 | 20 | 75 | 37 |
| PLASTANOX ® 2246[d] (2,2'-methylenebis(4-methyl-6-t-butylphenol)) | 0.6 | 0.6 | 0.6 | 0.6 |
| ACRYLOID ® B-44[e] (2-propenoic acid, 2-methyl-, 2-ethyl-2-[[(2-methyl-1-oxo-2-propenyl)oxy]methyl]-1,3-propanediyl ester, polymer with ethyl 2-propenoate and methyl 2-methyl-2-propenoate) | | 50 | 50 | 100 |
| PICCO ® LTP100[f] (alkylated aromatic hydrocarbon) | | | 20 | |

[a]Shell
[b]Hercules
[c]Penn.Ind.
[d]American Cyanamid
[e]Rohm & Haas
[f]Penn. Ind.

EXAMPLE #7

| Component | 7A | 7B | 7C | 7D |
|---|---|---|---|---|
| Toluene | 200 | 200 | 200 | 200 |
| KRATON ® 1107[a] (styrene-isoprene-styrene block copolymer) | 100 | | | |
| WINGTACK ® 95[b] (polyterpene resin/petroleum copolymer) | 100 | | | |
| SHELLFLEX ® 371[c] (naphthenic oils) | 60 | | | |
| CUMAR ® LX509[d] (coumarone-indene resins) | 40 | | | |
| Butyl ZIMATE ®[e] (zinc di-n-butyldithiocarbamate) | 5 | | | |
| Resin R-2338[f] (hot melt styrene-isoprene-styrene block copolymer with rosin ester tackifiers) | | 200 | | |
| DUROTAK ® 4134[g] (hot melt styrene-isoprene-styrene block copolymer with rosin ester tackifiers) | | | 200 | |
| Resin H2334F[h] (hot melt styrene-isoprene-styrene block copolymer with rosin ester tackifiers) | | | | 200 |

[a]Shell
[b]Goodyear
[c]Shell
[d]Neville
[e]Vanderbilt
[f]HB Fuller
[g]National Starch.
[h]Findley

EXAMPLE #8

A pressure sensitive adhesive composition, e.g., Morgan Adhesives MT-2 adhesive, was coated to a thickness of between 0.2 and 5 mils dried on 2 mil polyester (e.g., PET) and laminated to polyolefin foams. In one series, various barrier coatings (formulas 1A to 1D and 2A to 2D) were applied to a polyolefin foam at a thickness of 1.0 mil, while a second series had no barrier coating applied. Using a 180o peel test (ASTM D-903-49), the following results were obtained.

| Time | No coating | Coating |
| --- | --- | --- |
| 30 minutes | 0.5 lbs/linear inch | foam tear |
| 24 hours | 0.6 lbs/linear inch | foam tear |
| 2 days | 0.6 lbs/linear inch | foam tear |
| 7 days | 0.6 lbs/linear inch | foam tear |
| 30 days | 0.6 lbs/linear inch | foam tear |

The significance of this being that with the switch from chlorofluorocarbons to hydrochlorofluorocarbons as the blowing agent, a significant increase in additives, particularly stearic acid was necessitated to achieve similar results. These additives accumulate at the surface of the foam, thereby making adhesive bonding difficult.

What is claimed is:

1. An insulation construction comprising:
   (a) an elongated foamed insulation member having a longitudinal slit with a pair of slit surfaces formed by the slit in the member to allow the insulation to be fitted on or around a shaped article;
   (b) at least one attachment zone extending circumferentially about the insulation member a distance from the peripheral edge of the slit;
   (c) a primer layer coated onto an outer surface of at least one attachment zone; and
   (d) an adhesive layer coated over at least a portion of the at least one attachment zone, the layer closing the slit of the insulation member.

2. The insulation construction of claim 1 wherein the adhesive strip further comprises:
   (a) a base layer;
   (b) a pair of separated parallel adhesive regions extending along a length of the adhesive strip; and
   (c) a non-adhesive region between the parallel adhesive regions.

3. The insulation construction of claim 1 wherein the foamed insulation member is selected from the group consisting of foams of polyurethane, rubber latex, polyethylene, polypropylene, vinyl polymers, polystyrene, epoxy, and polyvinyl chloride.

4. The insulation construction of claim 1 wherein said primer layer comprises during coating and before drying about 1% to 30% by weight of a finely divided silica powder and about 10% to 60% by weight of a polymer selected from the group consisting of esters of acrylic and methacrylic acid and C2-C8 aliphatic alcohols mixed in an effective amount of a solvent selected from the group consisting of hydrocarbon and chlorohydrocarbon solvents.

5. The insulation construction of claim 4 wherein the primer layer further comprises polyvinyl acetate mixed with said polymer.

6. An insulation construction comprising:
   (a) an elongated fibrous insulation member having an exterior side and at least one longitudinal slit with at least a pair of slit surfaces formed by the at least one slit in the member to allow the insulation to be fitted on or around a shaped article, the elongated member having an extending flap from one peripheral edge of the at least one slit;
   (b) at least one attachment zone extending circumferentially about the insulation member a distance from the peripheral edge of the at least one slit which is opposed to the flap;
   (c) a primer layer coated onto the at least one attachment zone; and
   (d) an adhesive layer coated onto an interior surface of the flap, the adhesive layer being secured to at least a portion of the at least one attachment zone, the flap closing the at least one slit of the insulation member.

7. The insulation construction of claim 6 wherein said primer layer comprises during coating and before drying about 1% to 30% by weight of a finely divided silica powder and about 10% to 60% by weight of a polymer selected from the group consisting of esters of acrylic and methacrylic acid and C2-C8 aliphatic alcohols mixed in an effective amount of a solvent selected from the group consisting of hydrocarbon and chlorohydrocarbon solvents.

8. The insulation construction of claim 7 wherein the primer layer further comprises polyvinyl acetate mixed with said polymer.

* * * * *

UNITED STATES PATENT AND TRADEMARK OFFICE
CERTIFICATE OF CORRECTION

PATENT NO.: 5,427,849

DATED: June 27, 1995

INVENTOR(S): McClintock et al.

It is certified that error appears in the above - identifed patent and that said Letters Patent is hereby corrected as shown below:

Column 12, line 2, replace "228" with --258--;
    Column 12, line 21, replace "228" with --258--;
    Column 17, line 32, replace "layer coated over" with --strip on--;
    Column 17, line 33, replace "layer" with --strip--.

Signed and Sealed this

Seventh Day of November, 1995

Attest:

BRUCE LEHMAN

*Attesting Officer*    *Commissioner of Patents and Trademarks*